April 12, 1960
Z. H. SANDERS
2,932,296
INCISION GUIDE
Filed Nov. 25, 1958
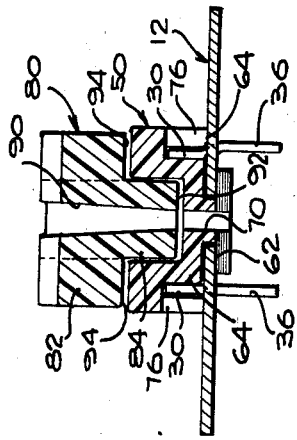
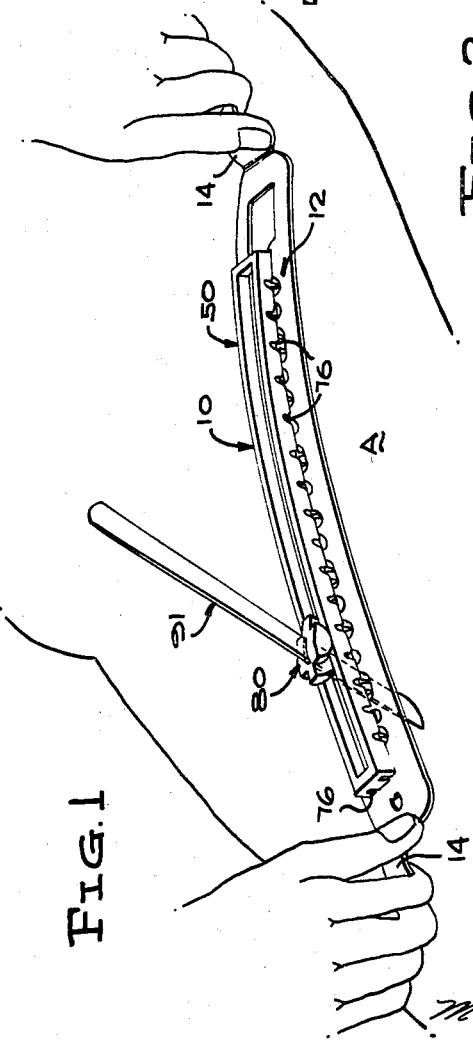
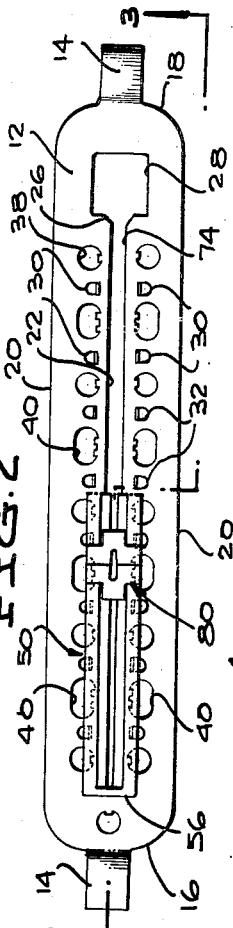
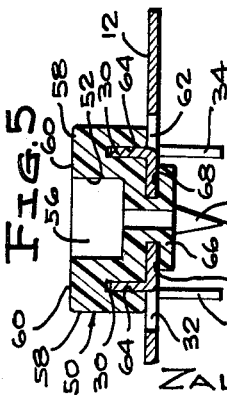
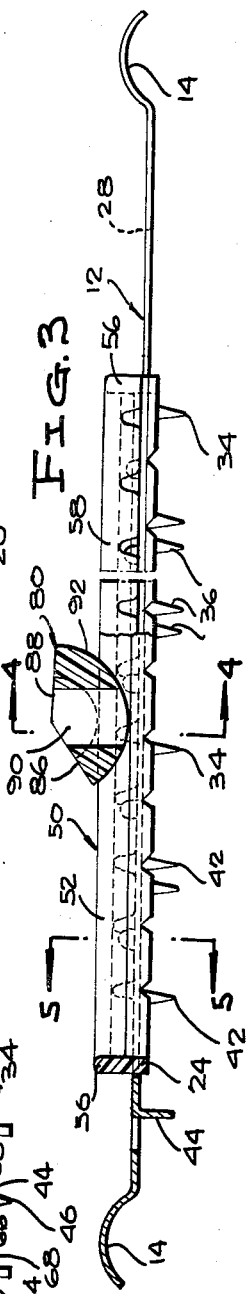
INVENTOR.
ZAL H. SANDERS
BY
McMorrow, Berman & Davidson
ATTORNEYS

United States Patent Office 2,932,296
Patented Apr. 12, 1960

2,932,296
INCISION GUIDE
Zal H. Sanders, Houston, Tex.

Application November 25, 1958, Serial No. 776,239

7 Claims. (Cl. 128—305)

This invention relates to improvements in mechanical guides for cutting implements and in making surgical incisions, and more particularly to an improved surgical incision guide for accurately guiding the making of first incisions in operations and for making patterns of punctures in the skin at opposite sides of incisions which enable accurately restoring the edges of incisions to original relations for suturing after operations, so as to assure straight and clean scars.

The primary object of the invention is to provide a simple, efficient, and easily used device of the character indicated above, which has teeth which make punctures in the skin along opposite sides of an incision to be made, which serve not only to make a pattern of skin puncture marks but which take purchase in the skin and thereby hold the skin in proper position and against shifting while an incision is made, using the device as a guide.

Another object of the invention is to provide a device of the character indicated above which facilitates and permits the speeding up of making incisions, and at the same time assures not only linear accuracy and limitation of length of cut in the manipulation of a scalpel or other cutting instrument in making an incision but also assures accurate rocking and angulations of the instrument on a fulcrum which is in a plane parallel to the surface of the body area being incised, so as to provide accurate control of depth of cut.

A further object of the invention is to provide a device of the character indicated above which is composed of a small number of simple and easily assembled parts, the parts being formed of materials resistant to the effects of repeated sterilization and being formed so as to be capable of being readily and completely cleansed and rendered sterile and sanitary.

Other important objects and advantageous features of the invention will be apparent from the following description and the accompanying drawings, wherein, for purposes of illustration only, a specific form of the invention is set forth in detail.

In the drawings:

Figure 1 is a schematic perspective view showing a device of the invention being held against a body area to be incised, with a scalpel positioned in the device;

Figure 2 is a top plan view of the device, a portion being removed to show structure;

Figure 3 is an enlarged vertical longitudinal section taken on the line 3—3 of Figure 2; and Figures 4 and 5 are further enlarged vertical transverse sections taken on the lines 4—4 and 5—5, respectively, of Figure 3.

Referring in detail to the drawings, wherein like numerals designate like parts throughout the several views, the illustrated device, generally designated 10, comprises an elongated flat flexible base 12, made of such as stainless steel, and having on its ends upwardly and longitudinally outwardly curved handles 14 of reduced width. The base or base plate 12 must be sufficiently thin and flexible, as to be capable of being curvedly deflected through angles of at least fifteen degrees, lengthwise of the base, in order to conform the base to the curvature of a body area A to be incised, by an assistant pressing downwardly on the handles 14.

The base 12 has preferably rounded ends 16 and 18, and parallel longitudinal side edges 20. The base 12 is formed with a longitudinal slot 22, preferably equally spaced from and parallel to the side edges 20. The slot 22 has a closed end 24 near to and spaced from the base end 16, and an open end 26 which opens through the middle of the adjacent edge of a substantially wider rectangular opening 28 which is located near to and is spaced from the base end 18. The purpose of the opening 28 is described hereinafter.

On opposite sides of the slot 22 the base 12 is provided with similar longitudinal rows of longitudinally aligned and spaced upstanding positioning lugs 30 which are struck up out of the material of the base 12 and leave smooth edged holes 32, through which the prongs hereinafter described can be seen. The rows of lugs 30 and the upper surface of the base 12 therebetween define a confining slideway for purpose hereinafter described.

Struck downwardly out of the material of the base 12 and generally in line with and between adjacent lugs 30 are alternating single and dual prongs 34 and 36, respectively, which leave smooth edged holes 38 and 40, respectively, through which the prongs 34 and 36 can be seen through the base 12. The prongs 34 and 36 are given sharpened lower ends 42 so that when the base 12 is pressed down upon the body area to be incised, the prongs will make puncture wound marks on the area, which are to be used, upon completion of an operation, as a pattern for accurately orientating the edges of the incision relative to each other by manipulating the otherwise often distorted cut edges of an incision so as to restore the pattern made by the device, and thereby assure accurate suturing, so as to produce a much desired straight and clean scar upon healing of the incision. An end prong 44 also having a sharpened lower end 46, is formed like the others, and is located centrally on the part of the base 12 between the base end 16 and the closed end 24 of the slot 22. The prongs serve the further important function of holding the flesh in the region of the incision against being undesirably spread and distorted while the incision is being made and as long as the device is held in place on the body area.

The device 10 further comprises a removable rail, generally designated 50, which is preferably made of non-metallic flexible but relatively incompressible material, such as plastic. The rail 50 is a longitudinally elongated block of substantially the same length as the base slot 22, and, as shown in Figures 4 and 5, has a generally rectangular, upwardly opening channel cross section. The rail has in its upper side a longitudinal recess 52 which terminates at its ends short of the ends of the rail, so as to define stop end walls 56 at the ends of the recess, and spaced from the sides of the block, so as to define laterally spaced rail elements 58 having plain flat and normally straight upper surfaces 60 which are parallel to the undersurface 62 of the block.

Centered in the undersurface 62 of the rail 50 relative to the rail elements 58 are downwardly opening grooves 64 which slidably receive the lugs 30 when the rail 50 is applied upon the base, whereby the rail 50 is positively held centered upon the base 12.

Centered on and preferably integral with the undersurface 62 of the rail 50 is a depending longitudinal rib 66 which extends the length of the rail and is narrower than the rail and has in its opposite sides longitudinal laterally outwardly opening grooves 68 whose upper walls are flush with the undersurface 62. The grooves 68 are arranged to slidably receive the edges of the base slot 22.

Formed through the rib 66 and opening through the bottom of the recess 52 is a centralized longitudinal slot 70, which extends substantially the length of the recess 52 and is of a width, narrower than the recess 52, to slidably accommodate cutting implements, such as a scalpel 72.

The rail 50 is assembled removably to the base 12 by passing an end of the rail 50 endwise into the base opening 28, in the direction of the base end 16, so as to engage the edges 74 of the base slot 22 in the lateral grooves 68 and then the lugs 30 into the rail grooves 64, whereupon the rail 50 is pushed further in the said direction until the rib 66 strikes the closed end 24 of the base slot 22. Removal of the rail 50 from the base 12 is accomplished by a reversal of these operations.

In order to afford sufficient flexibility to the rail while guarding against uncontrolled distortion of the rail when the base 12 is flexed to conform the device to a body area, the undersurface 62 and the sides and ends of the rail are indented with notches 76 spaced at suitable intervals therealong.

The device 10 further comprises a slidable and rockable implement holder 80 which is preferably in the form of a solid segment shaped block of non-metallic material, such as plastic. The holder 80, as shown in Figure 4, is of rectangular T-shaped cross section and involves a cross head 82 and a depending centered standard 84. The holder has an upper surface, which is composed of two angularly intersecting plane surfaces 86 and 88, and is indented by a centralized vertical longitudinal flat bore 90 which opens at its lower end through the underside of the standard 84. As shown in Figure 3, the sides of the bore 90 taper or converge downwardly so as to provide wedging surfaces for holding an implement, such as a scalpel 91, passed downwardly to operative position through the bore 90.

The standard 84 has a substantially semi-circular or semi-cylindrical undersurface 92, and at opposite sides of the standard, the cross head 82 has similar and concentric undersurfaces 94, to rock and slide upon the upper surfaces 60 of the rail elements 58, with the standard 84 positioned guidingly in the rail recess 52.

With a scalpel or other cutting instrument properly positioned through and held in selected position by and in the holder 80, the surgeon can make an incision, in the body area upon which the device 10 is held by an assistant, by sliding and rocking the holder 80 along the rail 50 at such angles as may be required to produce the desired length and depth of incision, the length of the incision being limited only by the longitudinal travel of the holder 80 between the end walls of the recess.

The components of the device 10, being readily separable from each other, are thereby easily thoroughly cleaned and sterilized separately, if desired, or the device can be sterilized and cleaned in assembled condition. The relatively free association of the holder 80 relative to the rail 50 makes possible rapid and easy changes or substitutions of cutting instruments in the course of making an incision, where such as found necessary or desirable, by exchanging on the rail 50 different holders in which cutting instruments have been securably engaged.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A surgical incision guide comprising a flat flexible base plate having an upper surface and ends, an elongated flexible rail mounted upon and secured to said upper surface and extending between said ends to flex with the base plate, handles on the ends of the base plate for depressing and flexing the base plate to conform to the contour of a body area to be incised, a holder bearing upon said rail to slide and rock therealong, and a cutting instrument mounted on said holder and extending below the base plate.

2. A surgical incision guide comprising a flat flexible base plate having ends and an upper surface, handles on said ends for depressing and flexing the base plate to conform to a body to be incised, a slideway disposed longitudinally upon said base plate between said ends, a flexible rail disposed lengthwise in and secured in said slideway, said base plate having a longitudinal slot therethrough, said rail having a longitudinal slot therethrough registered with the base plate slot, a cutting instrument holder bearing upon said rail and slidable and rockable therealong, and a cutting instrument mounted on said holder and extending downwardly through said slots.

3. A surgical guide according to claim 1, wherein said base plate has rows of skin puncturing prongs extending downwardly therefrom along opposite sides of the line of travel of the holder along the rail.

4. A surgical incision guide comprising a flat flexible base plate having ends and an upper surface, handles on said ends for depressing and flexing the base plate to conform to a body to be incised, a slideway disposed longitudinally upon said base plate between said ends, a flexible rail disposed lengthwise in and secured in said slideway, said base plate having a longitudinal slot therethrough, said rail having a longitudinal slot therethrough registered with the base plate slot, a cutting instrument holder bearing upon said rail and slidable and rockable therealong, and a cutting instrument mounted on said holder and extending downwardly through said slots, and downwardly projecting skin puncturing prongs on said base plate along opposite sides of the base plate slot.

5. A surgical incision guide comprising a flexible flat base plate having an upper surface and ends, said base plate having a longitudinal slot extending between said ends, said slot having a closed end adjacent to one end of the base plate and an open end at the other end of the base plate, said base plate having therein a wider opening into which said open end opens, an elongated flexible and removable rail having an upwardly opening closed end recess therein defining laterally spaced rail elements having upper surfaces, said rail having a depending narrow longitudinal rib wider than the base plate slot and undersurfaces at opposite sides of said rib, opposite sides of said rib having laterally opening grooves therein to receive the edges of the base plate slot, said rail being insertable endwise through said wider opening to engage the slot edges in said laterally opening grooves to mount the rail on the base plate, said rail having a longitudinal slot opening into said recess, a segmental holder of T-shaped cross section having a cross head and a standard depending therefrom, said cross head having arcuate undersurfaces bearing slidably and rockably upon the upper surfaces of the rail elements with the standard positioned in said recess and having an arcuate underside, said holder having a vertical bore therethrough, and a cutting instrument extending downwardly through and jammed in said bore and reaching below the base plate.

6. A surgical incision guide according to claim 5, wherein longitudinal rows of lugs are fixed on and rise from the upper surface of the base plate along opposite sides of the base plate slot, and said undersurfaces of the rail having downwardly opening longitudinal grooves therein slidably receiving related rows of lugs.

7. A surgical incision guide according to claim 5, wherein longitudinal rows of skin puncturing prongs are fixed on and depend from the base plate along opposite sides of the base plate slot, said prongs being struck out of the material of the base plate and forming sight holes through which the prongs can be seen from above the base plate.

References Cited in the file of this patent

UNITED STATES PATENTS

| | | |
|---|---|---|
| 2,556,036 | Jensen | June 5, 1951 |
| 2,633,196 | Taran | Mar. 31, 1953 |
| 2,835,037 | Middents | May 20, 1958 |

FOREIGN PATENTS

| | | |
|---|---|---|
| 1,001,827 | France | Oct. 24, 1951 |